(12) United States Patent
Kikstra et al.

(10) Patent No.: US 9,713,336 B2
(45) Date of Patent: Jul. 25, 2017

(54) EVISCERATION APPARATUS AND A METHOD FOR EVISCERATING SUSPENDED POULTRY

(71) Applicant: Meyn Food Processing Technology B.V.

(72) Inventors: Evert Kikstra, Oostzaan (NL); Hermanus Laurentius Zomerdijk, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 15/333,758

(22) Filed: Oct. 25, 2016

(65) Prior Publication Data

US 2017/0135356 A1    May 18, 2017

(30) Foreign Application Priority Data

Oct. 29, 2015 (NL) ........................ 2015690

(51) Int. Cl.
*A22C 21/00* (2006.01)
*A22C 21/06* (2006.01)

(52) U.S. Cl.
CPC .......... *A22C 21/06* (2013.01); *A22C 21/0007* (2013.01); *A22C 21/0053* (2013.01)

(58) Field of Classification Search
CPC ....... A22C 21/00; A22C 21/06; A22C 21/007; A22C 21/0015; A22C 21/0046; A22C 21/0053
USPC ........................................ 452/117–119, 173
See application file for complete search history.

(56) References Cited

U.S. PATENT DOCUMENTS

| 4,131,973 | A | * | 1/1979 | Verbakel | A22C 21/06 452/117 |
|---|---|---|---|---|---|
| 4,435,878 | A | | 3/1984 | Tieleman | |
| 6,811,478 | B2 | * | 11/2004 | van den Nieuwelaar | A22C 21/06 452/117 |
| 7,976,367 | B2 | * | 7/2011 | Sorensen | A22C 21/06 452/106 |

FOREIGN PATENT DOCUMENTS

| EP | 0 497 014 | 8/1992 |
|---|---|---|
| EP | 0 839 455 | 5/1998 |
| EP | 1 742 537 | 1/2007 |
| EP | 2 873 327 | 5/2015 |
| WO | WO 01/52658 | 7/2001 |

OTHER PUBLICATIONS

Search Report and Written Opinion for NL 2015690, dated Jul. 25, 2016, 14 pages.
Search Report and Written Opinion for NL 2015691, dated Jul. 26, 2016, 16 pages.

* cited by examiner

*Primary Examiner* — Richard Price, Jr.
(74) *Attorney, Agent, or Firm* — Dority & Manning, P.A.

(57) ABSTRACT

An evisceration apparatus for eviscerating a poultry carcass suspended by the legs, including an evisceration tool is movable up and down, and into and out of, a body cavity of the poultry, and two bracket halves that connect to each other. A hinge at a lower extremity of the tool is embodied with cooperating clamping faces adjacent to the hinge for clamping a part of the viscera of the poultry when the two bracket halves are moved towards each other from an open position into a closed position.

12 Claims, 10 Drawing Sheets

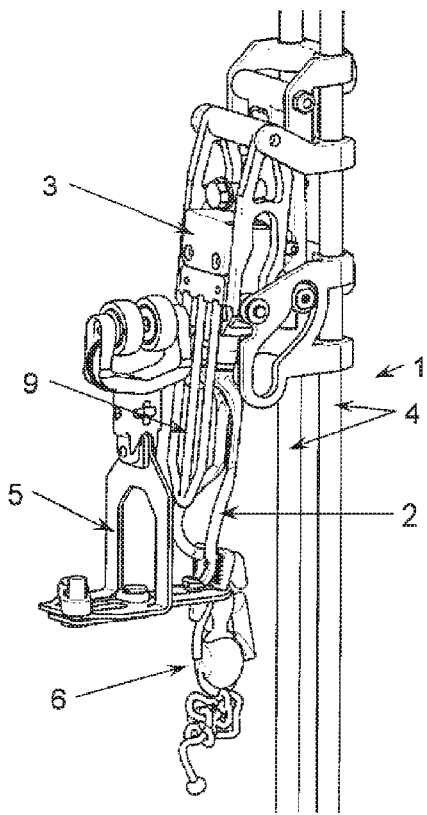
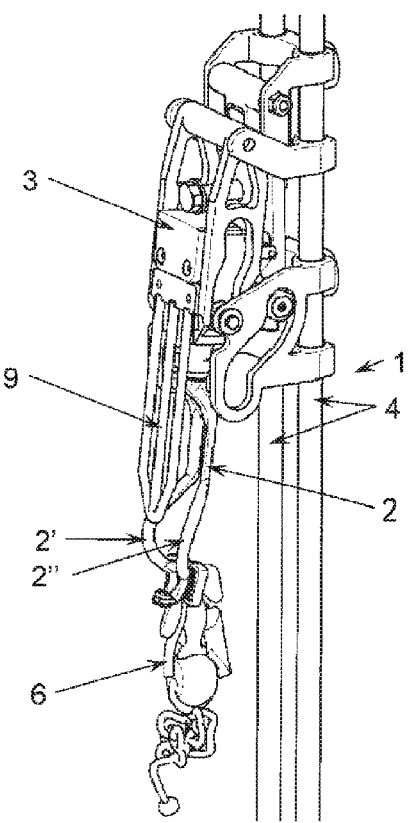
Fig. 1  Fig. 2
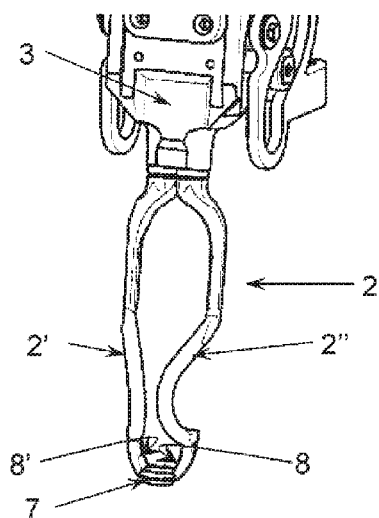
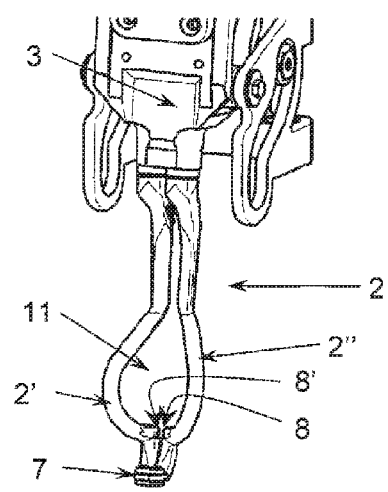
Fig. 3A  Fig. 3B

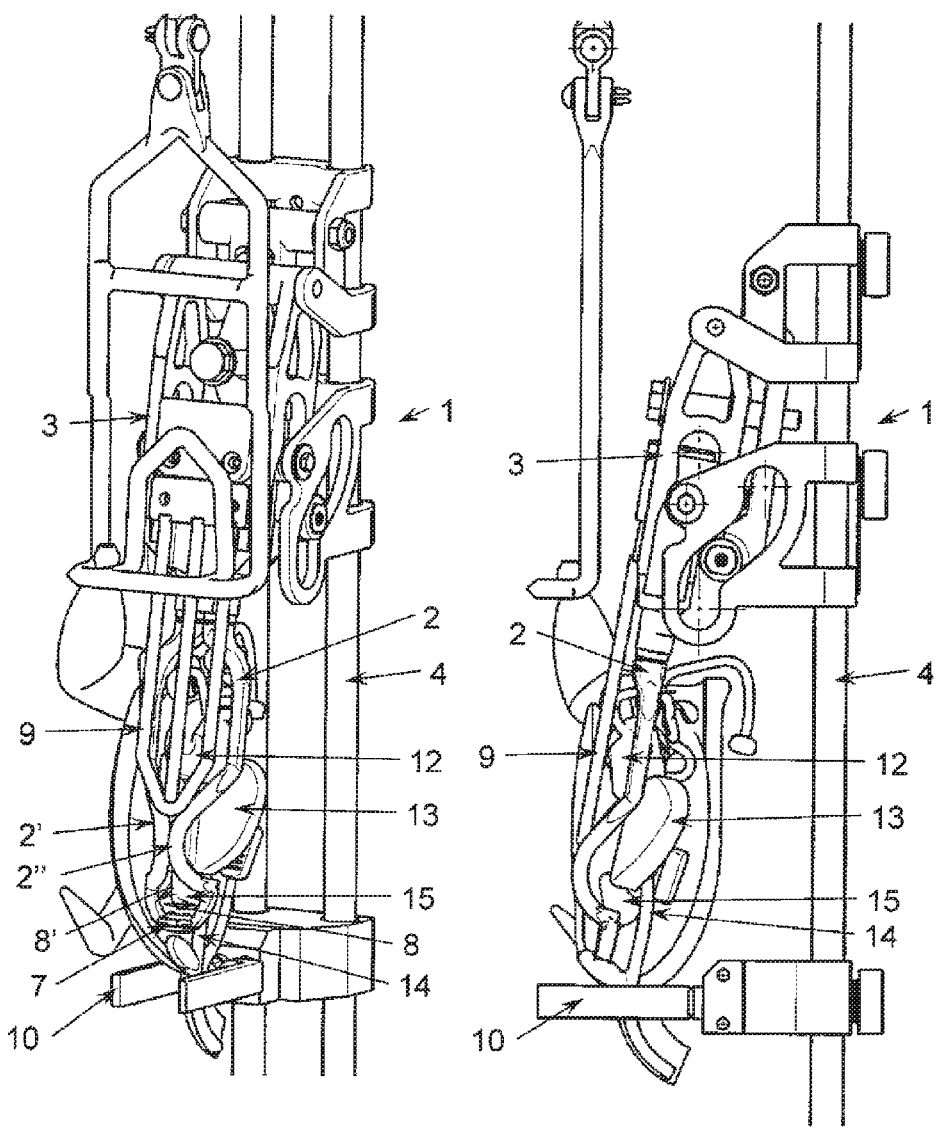

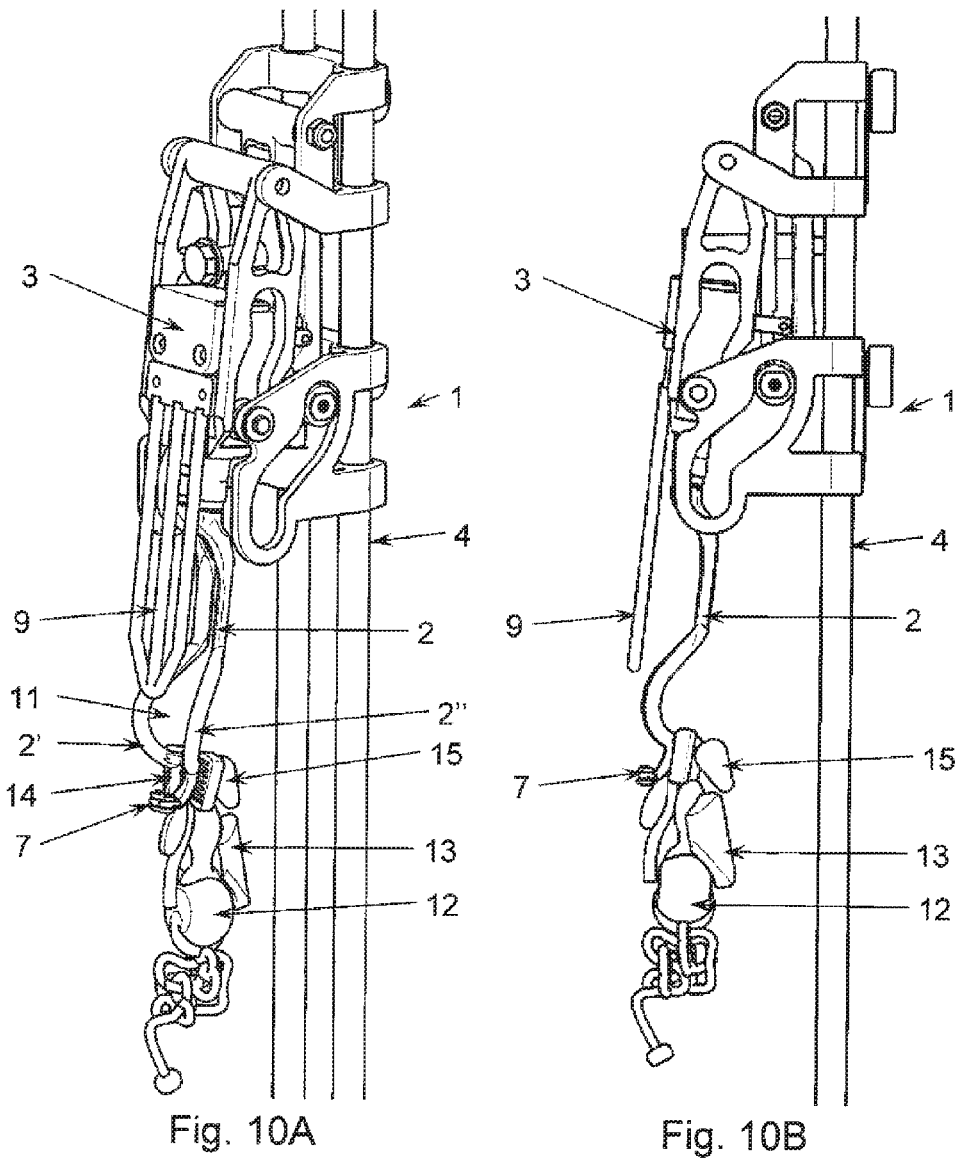

EVISCERATION APPARATUS AND A METHOD FOR EVISCERATING SUSPENDED POULTRY

PRIORITY STATEMENT

The present application claims priority under 35 U.S.C. §119 to Dutch Application No. 2015690, filed Oct. 29, 2015.

FIELD OF THE INVENTION

The subject matter of the present disclosure relates generally to a method for eviscerating a poultry carcass and relates to an evisceration apparatus for eviscerating such a poultry carcass suspended by the legs.

BACKGROUND OF THE INVENTION

A method and apparatus for eviscerating a poultry carcass are known from applicant's earlier European patent application EP-A-0 497 014. In the method that is known from this publication, the evisceration tool is introduced in its open position into the body cavity of the poultry until it reaches a lowermost position in the body cavity of the poultry; whereafter the two bracket halves are moved towards each other from the open position into a closed position therewith breaking tissue connections of the viscera with the remainder of the poultry carcass so that eventually a part of the viscera of the poultry, notably the gullet, is clamped. The two bracket halves are then moved in their closed position out of the body cavity of the poultry carcass together with the clamped viscera.

SUMMARY OF THE INVENTION

It is an object of the invention to improve the known method and apparatus and realize advantages in comparison with the prior art that will become apparent from the following disclosure. In one exemplary aspect, the present disclosure relates generally to a method for eviscerating a poultry carcass and relates to an evisceration apparatus for eviscerating such a poultry carcass suspended by the legs. This exemplary apparatus includes an evisceration tool that is movable up and down, and into and out of, a body cavity of the poultry. The evisceration tool includes two bracket halves that connect to each other with a hinge at a lower extremity of the tool. The two bracket halves are embodied with cooperating clamping faces adjacent to the hinge for clamping a part of the viscera of the poultry when the two bracket halves are moved towards each other from an open position into a closed position.

The invention has several aspects that relate to different features of the method and apparatus of the invention, which can be applied separate from each other but also in combination to realize the benefits of the invention to their fullest.

A first exemplary aspect of the invention relates to the feature that the two bracket halves have curvatures that are arranged such that a window is present immediately adjacent to the clamping faces when the two bracket halves are in the closed position, whereas the window immediately adjacent to the clamping faces is substantially closed when the two bracket halves are in the open position. This window enables that the larger parts of the viscera package, such as the gizzard and liver, can tip over through the window in a direction away from the supporting bracket so that after the tipping over is completed no tissue will cover the hinge of the two bracket halves. When the concerning organs are too large to pass through this window, the earlier mentioned support bracket prevents tipping over of the package from taking place in the wrong direction, which would result in covering of the hinge of the two bracket halves.

It is remarked that U.S. Pat. No. 4,435,878 indicates an evisceration tool provided with a window delimited by a loop having two elongated halves that are mirror images of one another and that provide bilateral symmetry about a central plane. The two elongated halves are immovable and provide no possibility of movement with respect to each other as opposed to the two bracket halves of the tool of exemplary embodiments of the invention that may swivel around a hinge that connects the two bracket halves. Accordingly, U.S. Pat. No. 4,435,878 does not disclose a hinge or any teaching, hint, or suggestion that relates to the problem of covering the hinge by the larger parts of the viscera package. Instead, the document points away from the invention by teaching to apply a teeth at the location where in the exemplary device of the invention the hinge is present. According to U.S. Pat. No. 4,435,878 the teeth scrapes the lungs from the backbone and ribs during upward movement of the evisceration tool and will therefore be covered by the eviscerated tissue. Needless to say, the application of the teeth at the location where otherwise a hinge would be makes U.S. Pat. No. 4,435,878 incompatible with the technology disclosed by EP-A-0 497 014.

Another independently applicable feature that can also be applied in combination with the other features of the invention mentioned herein relates to the aspect that the exemplary evisceration tool further includes a support bracket positioned next to the two bracket halves, which support bracket is movable up and down, and into and out of, the body cavity of the poultry simultaneously and synchronously with the two bracket halves. Accordingly, during the process of evisceration the support bracket is moved up and down, and into and out of, the body cavity of the poultry simultaneously and synchronously with the movement of the two bracket halves. This exemplary feature is particularly helpful in preventing that any part of the viscera package will tip over during or after removal of the viscera package from the body cavity of the poultry in a direction that would result in that tissue of the viscera package will cover the hinge of the tool. When this tipping over in an undesired direction is not prevented the tissue may, in the process of evisceration, eventually cover the hinge at the lower extremity of the tool, and it will then not be possible for a viscera conveyor to take over the viscera package from its most favorable position. This applies in particular when the exemplary evisceration tool is mounted on a carousel machine. It will then not be possible to take over the viscera package in a single action. The additional handling that is then required is detrimental to the automation of this process.

According to an exemplary aspect of the invention, it is preferred that the apparatus is arranged to cooperate with a transport shackle for an entrails package eviscerated from the body cavity of the poultry, wherein the support bracket is positioned between the transport shackle and the two bracket halves. This exemplary feature means that the viscera package can be taken over by the transport shackle in a single action when this transport shackle is in a position moving close to the periphery of the earlier mentioned carousel machine on which the evisceration tool is usually mounted. Suitably then the transport shackle can be equipped with jaws for clamping a part of the viscera or entrails package.

As mentioned the different features of the invention relate to different aspects which are applicable separate from each other or in combination. One of those exemplary aspects relates to the feature that the apparatus further includes, in an exemplary embodiment, a neck clamp for clamping a neck of the suspended poultry during movement of the two bracket halves out of the body cavity of the poultry while clamping a part of the viscera of the poultry. In the prior art the viscera package is simply pulled out of the body cavity while the poultry carcass is suspended by the legs and retained in position by the force of gravity. Gravity is, however, not always enough as a counterforce and the action of removing the two brackets with the clamped viscera package out of the body cavity may consequently result in tilting of the poultry carcass during evisceration. This may result in that the viscera package, and in particular the liver, may get damaged through contact with the body cavity and the tilted hole through which the evisceration tool is moved out of the carcass body. With the neck clamp the orientation of the poultry carcass is secured, and removal of the viscera package can be realized without risk of damaging the entrails. This also prevents rejections of the processed packages and corresponding poultry carcasses.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 schematically shows an evisceration apparatus according to an exemplary embodiment of the invention, wherein parts that do not contribute to the explanation of the invention are left out;

FIG. 2 shows the exemplary apparatus of FIG. 1, without a transport shackle for the entrails that are eviscerated;

FIGS. 3A and 3B show the two bracket halves of the evisceration tool of the evisceration apparatus in an open and closed position respectively;

FIGS. 7A and 7B show in isometric view and in cross-section the exemplary evisceration tool in its lowest position in the poultry body cavity wherein the tool is in its open position;

FIGS. 10A and 10B show in isometric view and in cross-sectional view a first example of a viscera package of average dimensions taken out with the evisceration tool of the invention;

The use of identical or similar reference numerals in different figures denotes identical or similar features.

DETAILED DESCRIPTION OF THE INVENTION

Figure 4A:
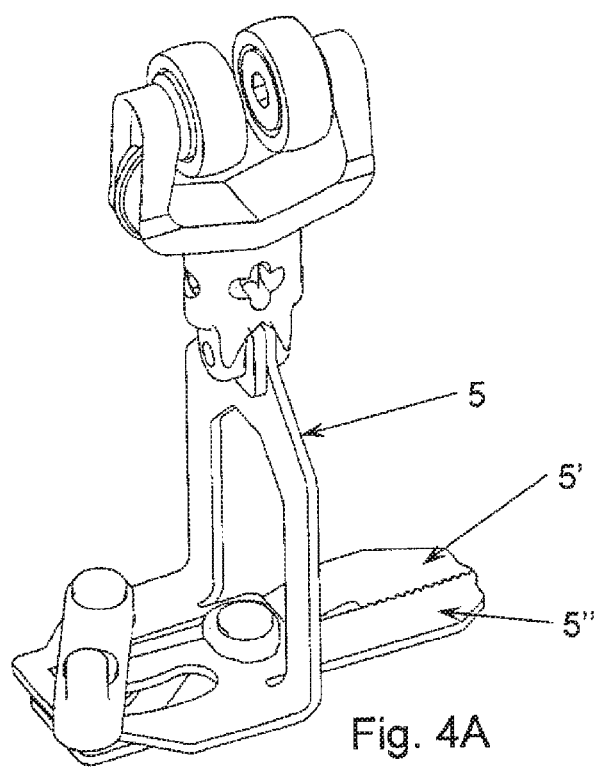
FIGS. 4A and 4B show an exemplary transport shackle for a viscera package eviscerated from a poultry carcass.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

FIG. 1 schematically illustrates an exemplary evisceration apparatus 1 according to the invention, together with a transport shackle 5 which is used for taking over and further conveying an entrails package or viscera 6 that is taken out of a poultry's body cavity. This will be further explained hereinafter. Such an exemplary evisceration apparatus 1 is preferably mounted on a carousel machine that is provided with multiple similar evisceration apparatuses. Since this is not essential to the invention this is not further shown in the drawing of the figures. In practice, a processing line feeds a series of poultry carcasses to the carousel machine and the poultry carcasses are at a high rate eviscerated, which is enabled by the multiple evisceration apparatuses of the carousel machine. In a manner known to the skilled person and therefore not shown in the drawing of the figures, each poultry carcass that is to be eviscerated is suspended by the legs while it is eviscerated.

The exemplary evisceration apparatus 1 includes an evisceration tool 2 which is movable up and down, and into and out of a body cavity of the poultry as will be explained hereinafter. For moving the evisceration tool 2 up and down it is mounted on a carrier 3 that is slidable along rods 4. Other solutions are however also feasible and the shown construction is not essential to the invention.

The evisceration tool 2 includes two bracket halves 2', 2" which can be better seen in FIG. 2, wherein for clarity the transport shackle is not shown.

FIG. 3A and FIG. 3B show the two bracket halves 2', 2" that connect to each other with a hinge 7 at a lower extremity of the tool 2. The two bracket halves 2', 2" are embodied with cooperating clamping faces 8, 8' adjacent to the hinge 7 for clamping a part of the viscera 6 of the poultry when the two bracket halves 2', 2" are moved towards each other from an open position as shown in FIG. 3A into a closed position as shown in FIG. 3B. FIGS. 1 and 2 show the two bracket halves 2', 2" in the closed position of FIG. 3B, wherein the evisceration tool 2 clamps and holds the viscera package 6.

FIG. 3A and FIG. 3B further show that the two bracket halves 2', 2" are provided with curvatures that arrange that the two bracket halves delimit a window 11 immediately adjacent to the clamping faces 8', 8" of the two bracket halves 2', 2" when the bracket halves are in the closed position as shown in FIG. 3B, whereas the window immediately adjacent to the clamping faces 8', 8" is substantially closed or absent when the two brackets 2', 2" are in the open position as shown in FIG. 3A.

Particularly, FIGS. 1 and 2 further show an exemplary aspect of the invention relating to the feature that the evisceration tool 2 further includes a support bracket 9 positioned next to the two bracket halves 2', 2". This support bracket 9 is movable up and down, and into and out of a poultry body cavity simultaneously and synchronously with the two bracket halves 2', 2". For that purpose it is preferable—although not essential—that the support bracket 9 is also mounted on the carrier 3 that is slidable along the rods 4. Other constructions are, however, also feasible as long as it is secured that the support bracket 9 will move simultaneous and synchronous with the two bracket halves 2', 2" into and out of the poultry body cavity during evisceration.

Figure 4B:
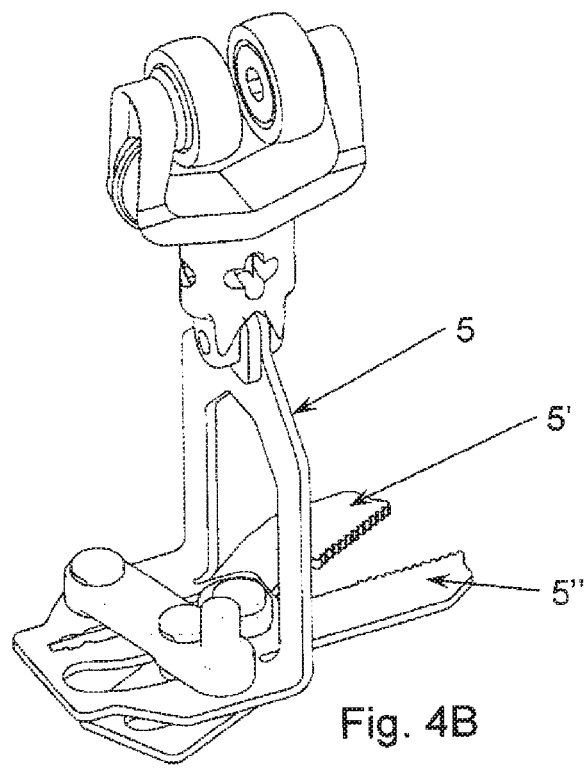

The support bracket 9 is thus arranged and maintained in a position to prevent that any part of the viscera package 6 will tip over in a undesired direction during or after removal of the viscera package 6 from the body cavity of the poultry so as to prevent that tissue of the viscera package 6 will eventually cover the hinge 7 at the lower extremity of the tool 2. The importance thereof resides in the ability of the evisceration tool 2 to cooperate with the transport shackle 5, which can move into the periphery of the carousel machine on which the evisceration tool 2 is mounted, so that the transport shackle 5 can take over the entrails package 6 eviscerated from the body cavity of the poultry in a single action and convey it for further processing down the line. The movement of the transport shackle 5 into the periphery of the carousel machine means that the support bracket 9 is then positioned between the transport shackle 5 and the two bracket halves 2', 2". To enable that the transport shackle 5 can take over the viscera package 6 from the evisceration tool 2 in a single action, the transport shackle 5 is suitably equipped with jaws 5', 5" for clamping a part of the viscera or entrails package as is clearly shown FIGS. 4A and 4B.

Figure 5:
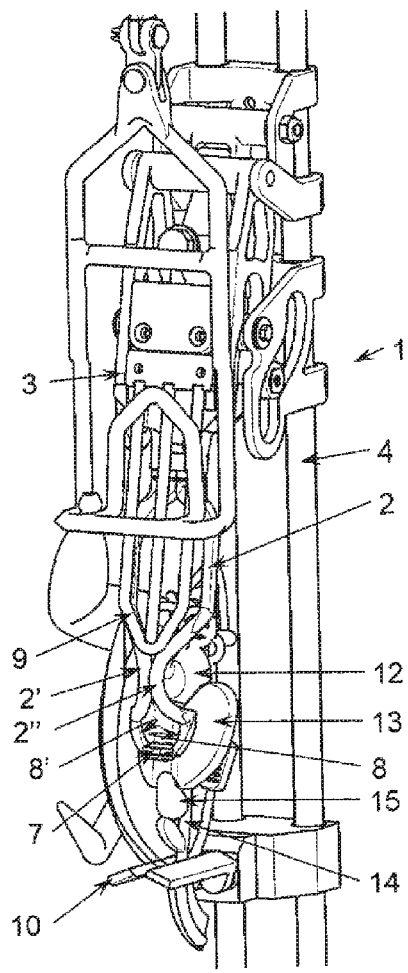
FIGS. 5 and 6 show an initial exemplary step of moving the evisceration tool into the poultry body cavity.
Figure 6:
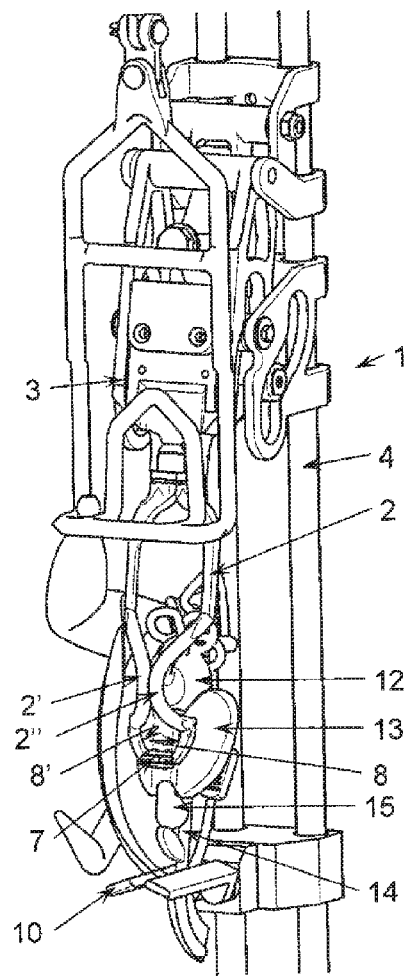

Turning now to FIG. 5 it is shown that the evisceration apparatus 1 can further include a neck clamp 10 for clamping a neck of the suspended poultry. In FIG. 5, the neck clamp 10 is open but it is closed during movement of the two bracket halves 2', 2" out of the body cavity of the poultry while clamping a part of the viscera 6 of the poultry as will be elucidated hereinafter with reference to FIGS. 8 and 9. Otherwise, FIG. 5 (and also FIG. 6) depicts that the apparatus of the invention without support bracket) shows the initial movement of the evisceration tool 2 into a poultry body cavity, wherein the two bracket halves 2', 2" are in their open position, and wherein the tool 2 passes the gizzard 12 and liver 13 at the breast side of the bird.

FIGS. 7A and 7B show that the evisceration tool 2 has reached its lowest position in the poultry body cavity, wherein the two bracket halves 2', 2" are still in their open position. For clarity also the relative position of the gizzard 12, the liver 13, and the gullet 14 which is to be clamped or pinched by the two bracket halves 2', 2" is shown.

Figure 8A:
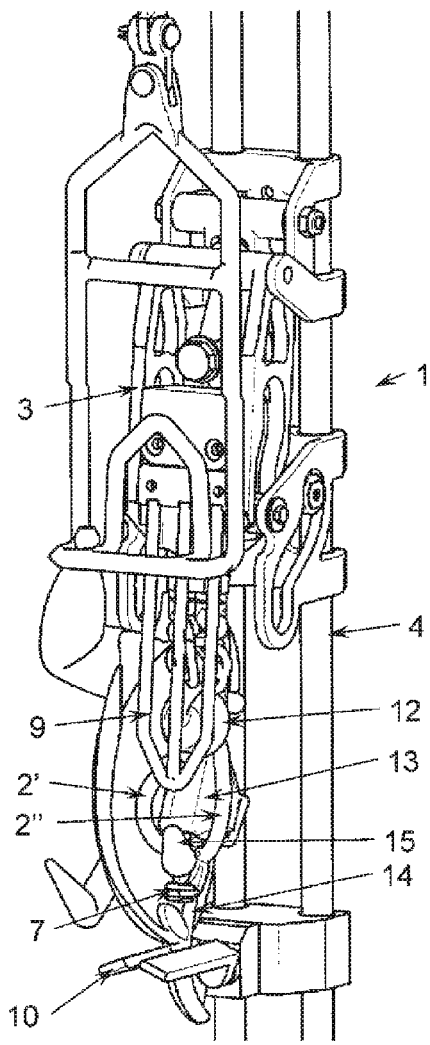
FIGS. 8A and 8B show in isometric view and in cross-section the exemplary evisceration tool in its lowest position in the poultry body cavity wherein the tool is moved to its closed position.
Figure 8B:
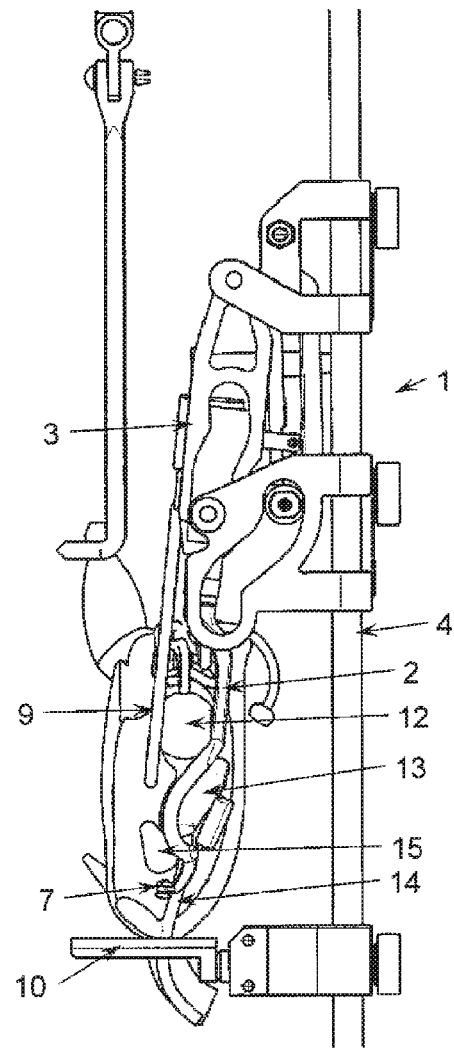

In FIG. 8A and FIG. 8B it is shown that subsequently the neck clamp 10 is closed, and the gullet 14 is clamped by moving the two bracket halves 2', 2" into their closed position. The gizzard 12 is shown as being positioned between the evisceration tool 2 and the support bracket 9, wherein the support bracket 9 prevents that the viscera package 6 will tip over in an undesired direction which would result in that tissue of the viscera package 6 will cover the hinge 7 at the lower extremity of the tool 2. The support bracket 9 therefore prevents that such tissue can cover the hinge 7 which would stand in the way of the object to enable the transport shackle 5 to take over the viscera package 6 of the evisceration tool 2 in a single action.

Figure 9A:
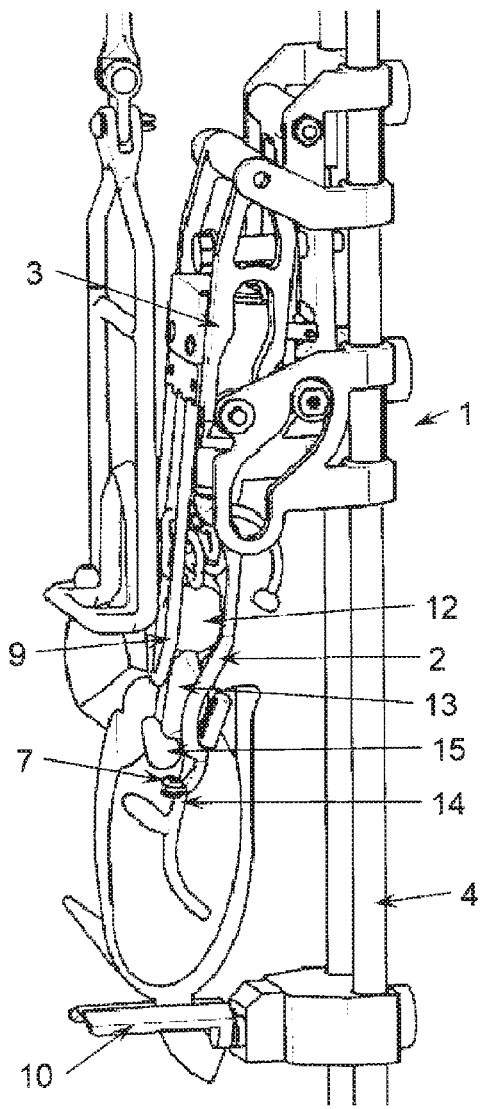
FIGS. 9A and 9B show in isometric view and in cross-section the evisceration tool moving upwards while the poultry's neck is clamped by a neck clamp.
Figure 9B:
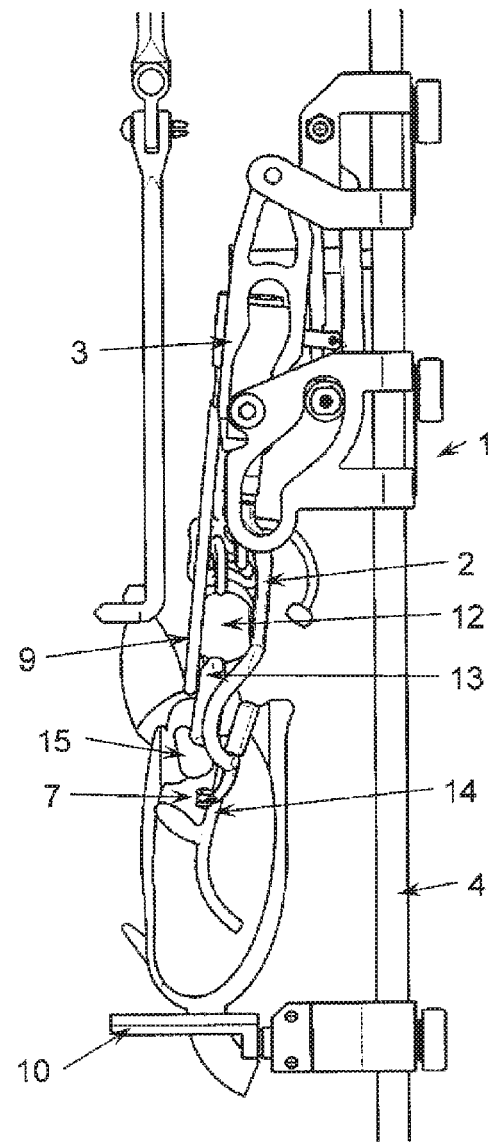
Figure 11:
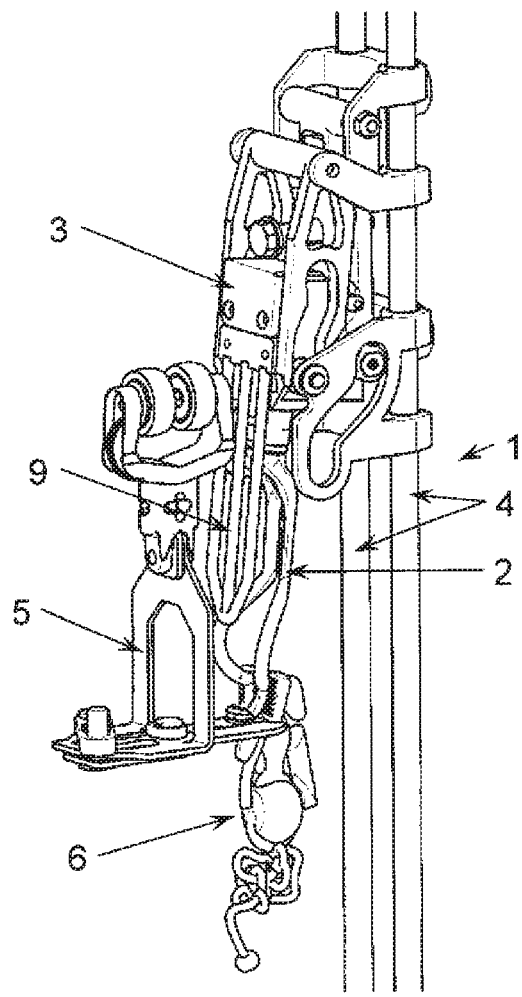
FIG. 11 shows the action of taking over of the viscera package of FIGS. 10A and 10B by a transport shackle.

FIGS. 9A and 9B show that the evisceration tool 2 and the support bracket 9 are moved out of the bird. This movement of the evisceration tool 2 and the support bracket 9 occurs simultaneously and synchronously and starts in their lowest position in the poultry body cavity shown in FIGS. 8A and 8B. During this movement the gullet 14 is clamped between the two bracket halves 2', 2" of the evisceration tool 2, and the neck of the poultry is clamped by the neck clamp 10. This simultaneous clamping of the gullet 14 and the neck of the poultry carcass promotes the effective separation of the viscera package 6 from the remainder of the poultry carcass. Because of the simultaneous and synchronous movement of the evisceration tool 2 and the support bracket 9, the support bracket 9 continuously and effectively avoids that any part of the viscera package 6 will tip over in an undesired direction which would result in that tissue would eventually cover the hinge 7 of the evisceration tool 2.

FIGS. 10A and 10B illustrate that due to the feature that the two bracket halves 2', 2" are provided with curvatures that arrange that the two bracket halves delimit a window 11 when the bracket halves are in the closed position (as explained with reference to FIG. 3B), it is possible for the gizzard 12 and the other organs, such as the heart 15 and the liver 13, to move through the window 11 such that the viscera package 6 will be suspended from the evisceration tool 2 without any part of the viscera package 6 covering the hinge 7 of the evisceration tool 2. Accordingly it is possible for the transport shackle 5 which moves into the periphery of a carousel machine on which the evisceration tool 2 is mounted, to grip and take over the gullet 14 from the evisceration tool 2 in a single action.

Figure 12A:
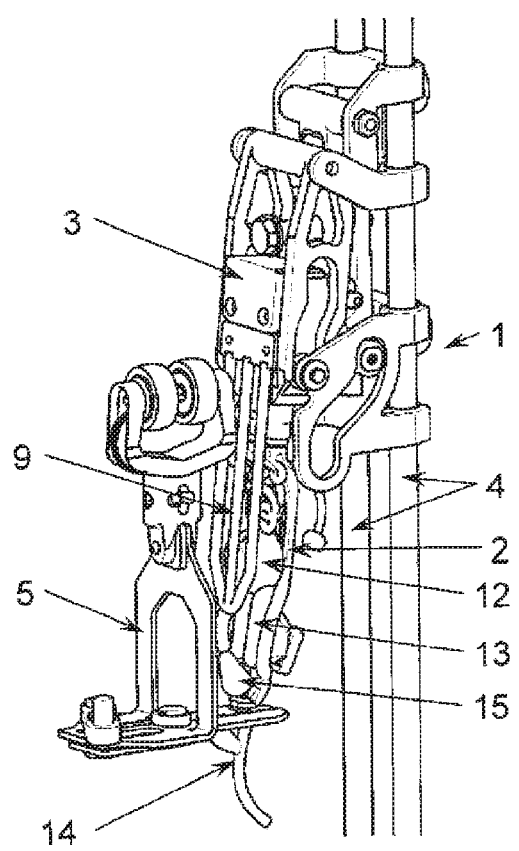
FIGS. 12A and 12B show in isometric view and in cross-sectional view a second example of a viscera package of more than average dimensions taken out with the exemplary evisceration tool of the invention.
Figure 12B:
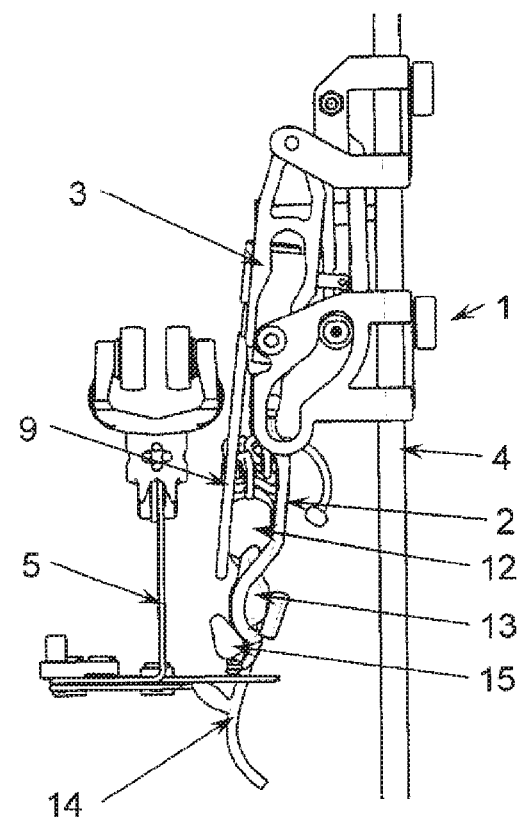
Figure 13A:
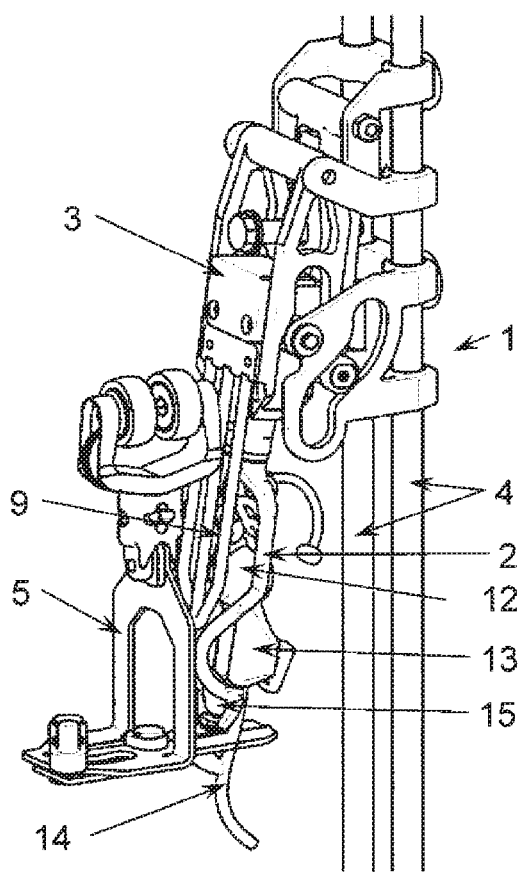
FIGS. 13A and 13B show the action of taking over of the viscera package of FIGS. 12A and 12B by a transport shackle.
Figure 13B:
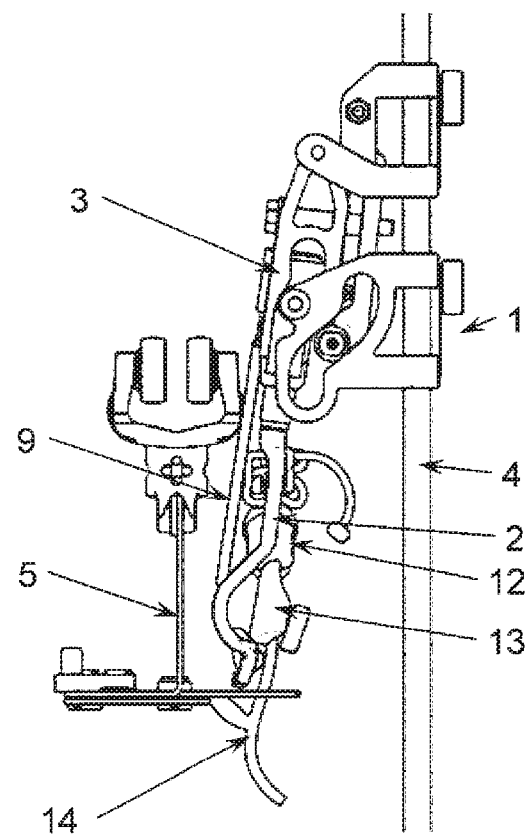

FIGS. 12A and 12B show an alternative situation in which the gizzard 12 has dimensions that prevent it from moving through the central window 11 of the evisceration tool 2 when its two bracket halves 2', 2" are in the closed position. In that situation the original orientation of the viscera package 6 in the poultry body cavity is maintained also after its removal from the poultry body cavity. FIG. 13 then shows that likewise it is possible for the transport shackle 5, which moves into the periphery of a carousel machine on which the evisceration tool 2 is mounted, to grip and take over the gullet 14 from the evisceration tool 2 without there being any tissue covering the hinge 7 of the two bracket halves 2', 2" which could form a hindrance for the transport shackle 5 to take over the viscera package 6.

Although the invention has been discussed in the foregoing with reference to an exemplary embodiment of the apparatus of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. An evisceration apparatus for eviscerating a poultry carcass suspended by the legs, comprising:
an evisceration tool that is movable up and down, and into and out of a body cavity of the poultry, wherein the evisceration tool comprises
two bracket halves that connect to each other with a hinge at a lower extremity of the tool, wherein said two bracket halves are embodied with cooperating clamping faces adjacent to the hinge for clamping a part of the viscera of the poultry when the two bracket halves are moved towards each other from an open position into a closed position,
wherein the two bracket halves are provided with curvatures that arrange that the two bracket halves delimit a window in one of the open and closed positions of the two bracket halve, wherein the curvatures are arranged such that the window is present immediately adjacent to the clamping faces when the two bracket halves are in the closed position, wherein the window immediately adjacent to the clamping faces is substantially closed or absent when the two brackets are in the open position.

2. An evisceration apparatus as in claim 1, wherein the evisceration tool further comprises a support bracket positioned next to the two bracket halves, which support bracket is movable up and down, and into and out of the body cavity of the poultry simultaneously and synchronously with the two bracket halves.

3. An evisceration apparatus as in claim 2, wherein the support bracket is arranged to prevent that any part of the viscera package will tip over during or after removal of the viscera package from the body cavity of the poultry in a direction which would result in tissue of the viscera package covering the hinge of the tool.

4. An evisceration apparatus as in claim 3, wherein the apparatus is arranged to cooperate with a transport shackle for an entrails package eviscerated from the body cavity of the poultry, wherein the support bracket is positioned between the transport shackle and the two bracket halves.

5. An evisceration apparatus as in claim 4, wherein the transport shackle is equipped with jaws for clamping a part of the viscera or entrails package.

6. An evisceration apparatus as in claim 5, further comprising a neck clamp for clamping a neck of the suspended poultry during movement of the two bracket halves out of the body cavity of the poultry while clamping a part of the viscera of the poultry.

7. An evisceration apparatus as in claim 6, wherein the apparatus is mounted on a carousel machine.

8. A method for eviscerating poultry suspended by the legs, comprising:
using an evisceration tool comprising two bracket halves that connect to each other with a hinge at a lower extremity of the tool, wherein the two bracket halves are embodied with cooperating clamping faces adjacent to the hinge for clamping a part of the viscera of the poultry when the two bracket halves are moved towards each other from an open position into a closed position;
introducing the evisceration tool in its open position into the body cavity of the poultry up to a lowermost position in the body cavity of the poultry;
moving the two bracket halves towards each other from the open position into a closed position therewith breaking tissue connections of the viscera with the remainder of the poultry carcass and eventually clamping a part of the viscera of the poultry;
removing the two bracket halves in its closed position from the body cavity of the poultry carcass together with the clamped viscera;
providing curvatures in the two bracket halves that arrange that the two bracket halves delimit a window in the closed position of the two bracket halves for preventing that any part of the viscera package will tip over during or after removal of the viscera package from the body cavity of the poultry in a direction that would result in that tissue of the viscera package will cover the hinge at the lower extremity of the tool.

9. A method for eviscerating poultry suspended by the legs as in claim 8, further comprising providing the evisceration tool with a support bracket next to the two bracket halves and moving the support bracket up and down, and into and out of the body cavity of the poultry simultaneously and synchronously with the movement of the two bracket halves.

10. A method for eviscerating poultry suspended by the legs as in claim 9, further comprising providing a transport shackle for an entrails package eviscerated from the body cavity of the poultry and positioning the transport shackle such that the support bracket is positioned between the transport shackle and the two bracket halves.

11. A method for eviscerating poultry suspended by the legs as in claim 10, further comprising fixing the neck of the poultry carcass in position during movement of the two bracket halves out of the body cavity of the poultry together with the clamped viscera.

12. A method for eviscerating poultry suspended by the legs as in claim 11, further comprising mounting the evisceration tool on a carousel machine.

* * * * *